(No Model.)

J. M. SWEENEY.
METALLIC STEAM PIPE CONNECTION.

No. 294,160. Patented Feb. 26, 1884.

WITNESSES.
Geo. K. Storm
Elisha B. Howard

John M. Sweeney  INVENTOR
by
Howard Bros  ATTORNEYS.

UNITED STATES PATENT OFFICE.

JOHN M. SWEENEY, OF WHEELING, WEST VIRGINIA.

METALLIC STEAM-PIPE CONNECTION.

SPECIFICATION forming part of Letters Patent No. 294,160, dated February 26, 1884.

Application filed November 21, 1882. Renewed October 5, 1883. (No model.)

*To all whom it may concern:*

Be it known that I, JOHN M. SWEENEY, a resident of Wheeling, in the county of Ohio and State of West Virginia, have invented certain new and useful Improvements in Metallic Steam-Pipe Connections; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates specially to metallic steam-pipes; but it is also applicable to piping in general used for conveying water, gas, oil, and similar fluids or gases.

The object of my invention is to provide a means of joining pipes together at the ends in such a manner that a perfectly tight and reliable connection will be secured, and one that can be readily disconnected when desired for repairs, &c.

Figure 1:
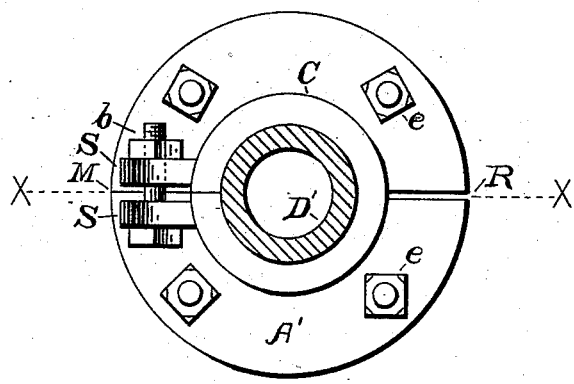
Figure 2:
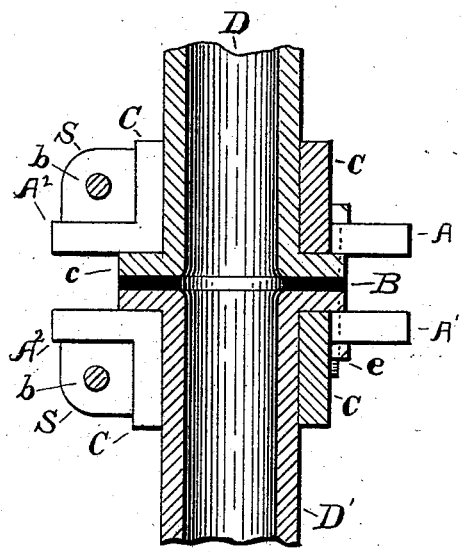

In the drawings, Figure 1 is an end view of the flange; Fig. 2, a sectional view on line $xx$.

The letters D D' designate sections of pipe.

The letters A A' each represent separate flanges joined together by small bolts $e$ in the usual manner of flange connections.

B is the gasket or packing-ring placed between the flanges. These flanges are made preferably of cast-iron, and consist simply of a collar, C, and projecting ring $A^2$, and have lugs S S cast on the rim close to each other on one side of the ring $A^2$. Between these lugs the ring $A^2$ and collar are sawed through in a straight line, M, to the pipe-opening in the center. Through the lugs S S is passed a small bolt, $b$, for the purpose of drawing the divided parts of the flange together. On the opposite side of the lugs S S ring $A^2$ is cut through at R up to the collar C, to permit such collar to yield and the opposite split sides to separate, in order that the collar may be fitted upon the pipe and pressed thereon, it being evident that unless the base-flange of the collar were cut, as at R, its rigidity would not permit the collar to spring or the opposite sides to separate. The pipe-opening in the collar is made somewhat smaller than the pipe to be fitted, and in order to get it on the pipe a wedge is inserted between the lugs S S, and the ring and collar sprung open a sufficient distance to permit of it being placed over the pipe and secured tightly thereto by means of the small bolt $b$ provided for this purpose. As an additional means to obtain a reliable connection where copper pipe is used the end may be passed through and flanged over, as at $c$, making a secure joint, and where iron pipes are used the end may be beaded to assist in preventing the strain lengthwise. This manner of constructing the flanges permits of their being clamped tightly to the pipe without the aid of rivets, swelling the pipes, or brazing them together, and thus secure a safe and permanent steam-tight connection, and is especially useful where seamless drawn pipe is used. The advantage of being able to disconnect the pipe for repairs will at once suggest itself to those versed in this class of work.

Having described my invention, what I claim, and desire to secure by Letters Patent of the United States, is—

1. The combination, with the flanged ends of the pipes D D', of the laterally-split collars A, adapted to be sprung one upon the end of each pipe, and to be connected by longitudinal bolts $e\ e$, substantially as described.

2. An improved flange-coupling for connecting pipe ends together, consisting of a ring, $A^2$, and collar C, the flange cut through to the collar at R, and cut through the flange and collar at $m$, and having lugs S S and compression-bolt $b$, substantially as and for the purpose set forth.

3. In combination with the pipes, a coupling consisting of an annular collar, C, and a base-ring, $A^2$, split upon one side entirely through said collar and base-ring, and upon the opposite side through the said base-ring alone, and having means, substantially as described, for clamping it upon the end of the pipe, substantially as described.

In testimony that I do claim the foregoing as my own I hereunto affix my signature in presence of two witnesses.

JNO. M. SWEENEY.

Witnesses:
  GEO. K. STORM,
  E. B. HOWARD.